(12) United States Patent
Southworth et al.

(10) Patent No.: US 12,027,804 B2
(45) Date of Patent: Jul. 2, 2024

(54) SYSTEM AND METHOD FOR DETECTING THE POSITION OF A COVER OF AN ELECTRICAL CONNECTOR

(71) Applicant: Stoneridge Control Devices, Inc., Canton, MA (US)

(72) Inventors: Robert O. Southworth, Mansfield, MA (US); Karanjit Singh Saini, Plainville, MA (US); Robert DiTommaso, Waltham, MA (US); Austin Waid-Jones, Randolph, MA (US)

(73) Assignee: STONERIDGE CONTROL DEVICES, INC., Novi, MI (US)

( * ) Notice: Subject to any disclaimer, the term of this patent is extended or adjusted under 35 U.S.C. 154(b) by 21 days.

(21) Appl. No.: 17/885,183

(22) Filed: Aug. 10, 2022

(65) Prior Publication Data

US 2022/0385002 A1    Dec. 1, 2022

(51) Int. Cl.
*H01R 13/66*   (2006.01)
*G01D 5/14*   (2006.01)
*H01R 13/447*   (2006.01)
*H01R 13/52*   (2006.01)

(52) U.S. Cl.
CPC ......... *H01R 13/6683* (2013.01); *G01D 5/145* (2013.01); *H01R 13/447* (2013.01); *H01R 13/5213* (2013.01)

(58) Field of Classification Search
CPC .............. H01R 13/6683; H01R 13/447; H01R 13/5213; G01D 5/145
See application file for complete search history.

(56) References Cited

U.S. PATENT DOCUMENTS

| | | | | |
|---|---|---|---|---|
| 5,229,975 A | * | 7/1993 | Truesdell | G01S 7/64 367/107 |
| 2005/0127900 A1 | * | 6/2005 | Johnson | G01D 5/145 324/207.2 |
| 2008/0278269 A1 | * | 11/2008 | Ramirez | G06F 1/1679 335/205 |
| 2013/0329359 A1 | * | 12/2013 | Andre | G06F 1/1616 361/679.55 |
| 2014/0103619 A1 | * | 4/2014 | Motts | B60D 1/30 280/511 |
| 2017/0225665 A1 | * | 8/2017 | Ewel | H01H 45/02 |

* cited by examiner

*Primary Examiner* — Akm Zakaria
(74) *Attorney, Agent, or Firm* — Grossman, Tucker, Perreault & Pfleger, PLLC

(57) ABSTRACT

A trailer tow connector including: at least one set of terminals for coupling to corresponding terminals of a trailer connector; a cover having a closed position for covering the terminals and an open position for providing access to the terminals for connecting corresponding terminals of the trailer connector thereto; a magnet coupled to the cover; and a magnetic field sensor, the magnetic field sensor being configured to provide a first output when the cover is in the closed position and a second output different from the first output when the cover is in an open position.

16 Claims, 5 Drawing Sheets

SYSTEM AND METHOD FOR DETECTING THE POSITION OF A COVER OF AN ELECTRICAL CONNECTOR

CROSS REFERENCE TO RELATED APPLICATIONS

The present application is a continuation of U.S. application Ser. No. 16/549,617, filed Aug. 23, 2019, which claims the benefit of the filing date of U.S. Provisional Application No. 62/722,118, filed Aug. 23, 2018, the entire contents of which are both herein incorporated by reference.

FIELD

The present disclosure relates generally to electrical connectors, and to systems and methods for detecting the position of a cover of an electrical connector. In particular, the present disclosure relates to a trailer tow connector, and systems and methods for detecting the position of a cover of the trailer tow connector.

BACKGROUND

Vehicles commonly include an electrical trailer tow connector that is configured to accept a corresponding connector of a towed apparatus, e.g., a trailer. A variety of trailer tow connectors for mounting on a vehicle are well-known. One example of a trailer tow connector that includes two different connectors, i.e., a 7-way connector and a 4-way connector, to interface with corresponding connectors on a towed apparatus is described in U.S. Pat. No. 7,331,792 (the '792 patent), the entire content of which is hereby incorporated herein by reference. In other known configurations, a vehicle may be provided with one or more separate connectors, e.g., separate 4-way, 7-way, 8-way, 12-way connectors, etc.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION

Figure 1:
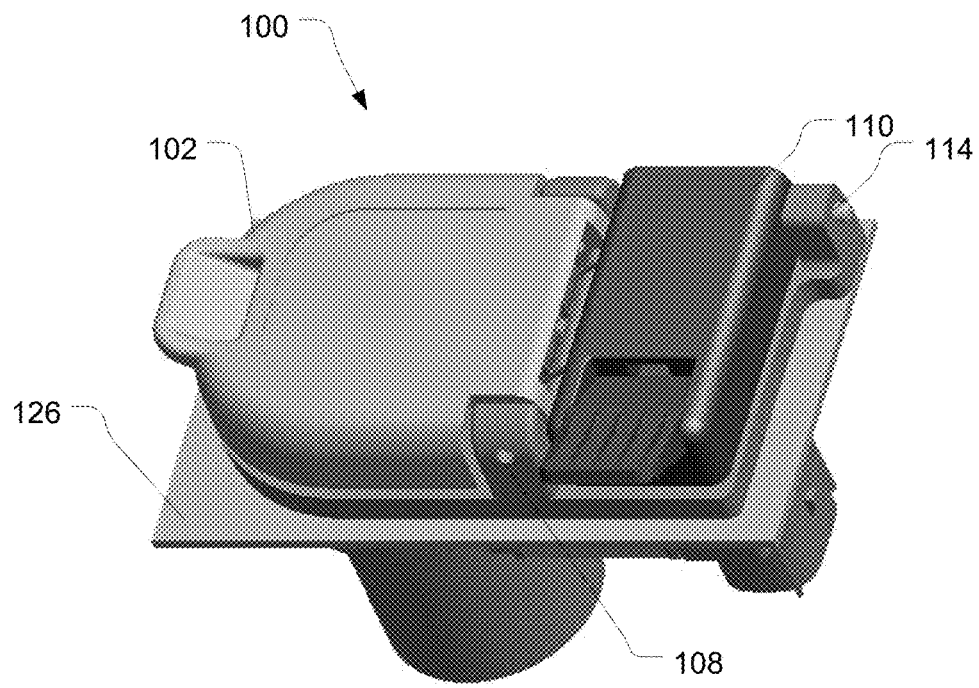
FIG. 1 is a top perspective view of one example of a connector consistent with the present disclosure, including a combined 7-way and 8-way connector.
Figure 2:
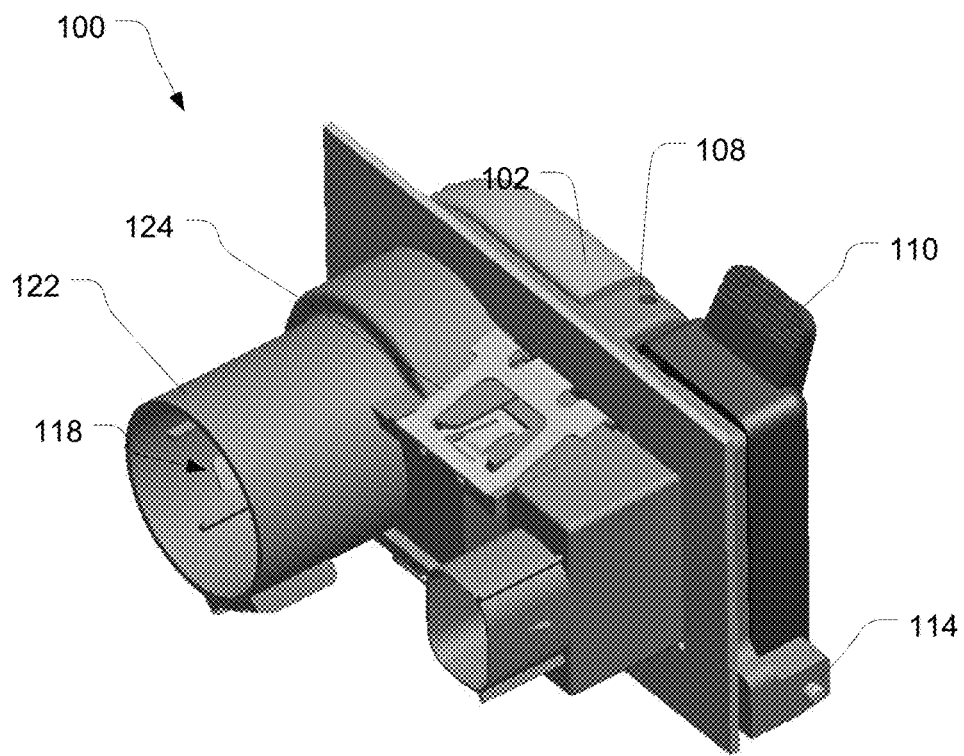
FIG. 2 is a bottom perspective view of the connector shown in FIG. 1.
Figure 3:
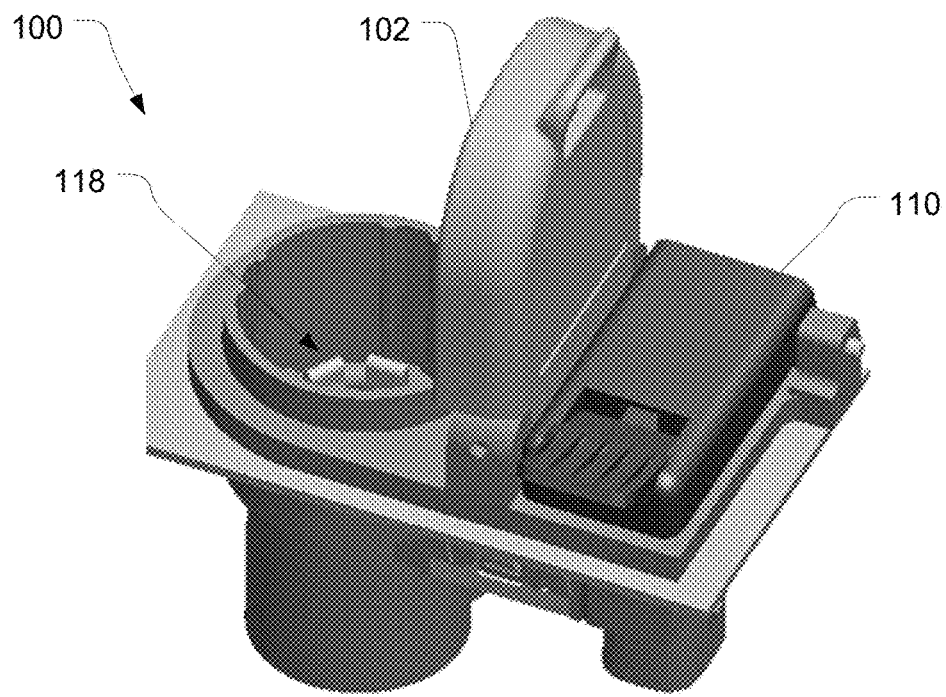
FIG. 3 is a top perspective view of the connector shown in FIG. 1, with a 7-way cover in an open position.
Figure 4:
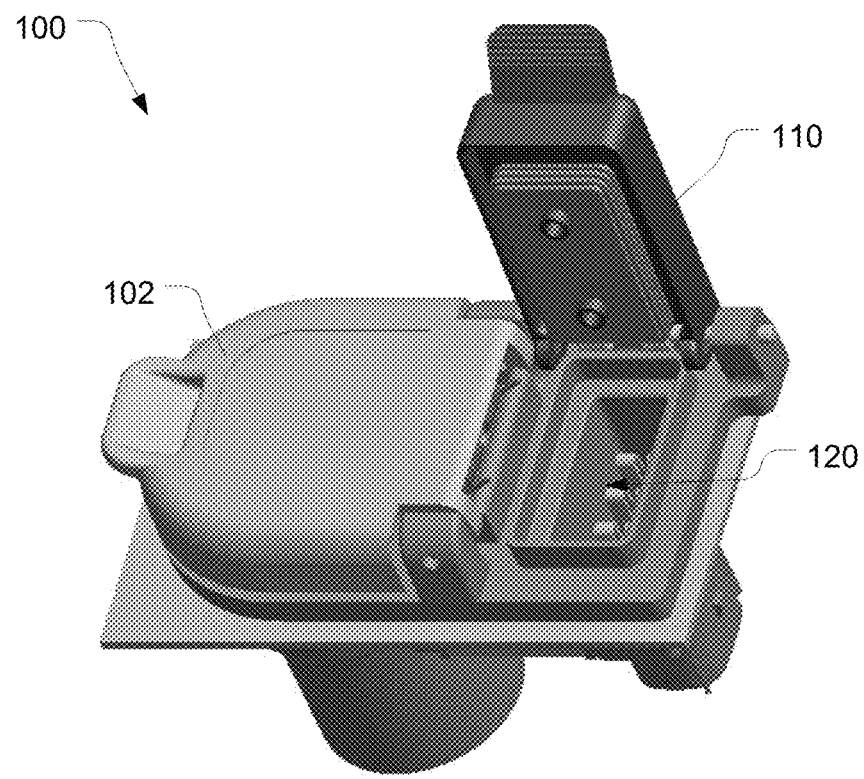
FIG. 4 is a top perspective view of the connector shown in FIG. 1, with an 8-way cover in an open position.

The present disclosure relates generally to electrical connectors (e.g., a trailer tow connector), and to systems and methods for detecting the position of a cover of an electrical connector. In some embodiments, the electrical connectors described herein include a housing, a set of terminals for coupling to corresponding terminals of a (e.g., trailer) connector, a cover that is movable between a first position and a second position, a magnet coupled to the cover, and a magnetic field sensor (e.g., a Hall effect sensor). In some embodiments the first position is a closed position in which the set of terminals is covered, and the second position is an open position in which the set of terminals is accessible for connecting to corresponding terminals of the (e.g., trailer) connector. In other embodiments the first position is an open position or a closed position, and the second position is an intermediate position between the open position and the closed position. In any case the magnetic field sensor is configured to provide a first output when the cover is in the first position, and to provide a second output when the cover is in the second position, wherein the second output differs from the first output. The position of the cover (e.g., its absolute or relative position) may be determined based on the output of the magnetic field sensor.

The electrical connector may further include first and second ferromagnetic pole pieces that are configured to direct a magnetic flux from the magnet to the magnetic field sensor. The first and second ferromagnetic pole pieces may each include a first end that is positioned proximate (e.g., adjacent) the magnet, and a second end that is positioned proximate (e.g., adjacent) the magnetic field sensor. The electrical connector may be configured such that when the cover moves between the first position and the second position, the magnet moves between the first and second pole pieces. One or both the first and second ferromagnetic pole pieces may include an inwardly directed arm, wherein the inwardly directed arm includes an end surface that is positioned proximate to (e.g., adjacent) the magnetic field sensor.

In some embodiments the cover is coupled to the housing (e.g., via a hinge pin or other suitable fastener) such that it rotates about an axis (e.g., extending parallel to the hinge pin) as it is moved between the first position and the second position, and vice versa. In such instances the magnet may rotate about the axis and/or the hinge pin as the cover is moved between the first position and the second position. The cover may further include a cavity for the magnet, and the magnet may be at least partially disposed within the cavity such that at least a portion of the magnet is positioned between the first and second ferromagnetic pole pieces and proximate the first end of the first and second ferromagnetic pole pieces, e.g., when the cover is in the first (e.g., closed) position, the second (e.g. open) position, or the first position and the second position.

Systems for detecting the position of a cover of an electrical connector are also described herein. In some embodiments, such a system includes a cover position detector that is coupled to an electrical connector (e.g. a trailer tow connector) consistent with the present disclosure. The cover position detector may include a vehicle bus and a processor, wherein the vehicle bus is coupled to a magnetic field sensor of the electrical connector, and the processor is coupled to the vehicle bus. The cover position detector may determine whether the cover is in a first position or a second position based on an output provided by the magnetic field sensor. Methods for detecting the position of a cover of an electrical connector using the electrical connectors and systems provided herein are also described.

In additional embodiments of a system and method consistent with the present disclosure, a trailer tow connector may be provided with at least one magnet coupled to a cover of the connector and at least one magnetic field sensor configured to sense a magnetic field established by the magnet. When the cover is in a first position, the magnetic field imparted to the magnetic field sensor causes the sensor to provide a first output indicating the cover is in the first position. When the cover is in the second position the field imparted to the magnetic field sensor causes the sensor to provide a second output, different from the first output, indicating that the cover is in the second position (e.g., an open position, a closed position, or an intermediate position between the open and closed positions). When the field sensor provides an output indicating the cover is in the first position (e.g., an open position), that output may be considered an indication that a trailer connector is coupled to the trailer tow connector. That output may be provided to the vehicle bus for use in controlling the vehicle and/or providing a notification to a user that that a trailer is connected to the vehicle. In some embodiments, the trailer tow connector may include one more pole elements for directing magnetic flux from the magnet to the magnetic field sensor—allowing the magnetic field sensor to be placed from the magnet by a distance that facilitates manufacturing and enhances durability.

FIGS. 1-4 illustrate one example of a connector 100 consistent with the present disclosure, in the context of a combined 7-8 way connector. The illustrated 7-8 way connector facilitates connection between a 7-way towed vehicle connector and an 8-way towed vehicle connector. The connection may provide electrical connections from the vehicle to the towed vehicle, such as electronic power, ground, lamps, left and right signals, cameras such as a backup camera, CAN and/or LIN bus, electronic brakes, etc. It is noted that the technologies described herein are not limited to combined 7-8 way connectors, but rather may be employed in any suitable type of electrical connector. For example, the technologies described herein may be used in various types of trailer tow connectors, including but not limited to a combined 4-7 way connector, combined 7-8 way connector, 7 way connector, 4-way connector, 8-way connector, an auxiliary output or input connector, combinations thereof, and the like.

The connector 100 includes a first (e.g., 7-way) cover 102, a first (e.g., 7-way) hinge pin 108, a second (e.g., 8-way) cover 110, a second (e.g., 8-way) hinge pin 114, a first set of (e.g., 7-way) terminals 118, a second set of (e.g., 8-way) terminals 120, a housing 122, mounting clips 124 and a vehicle mounting interface 126. In instances where the first set of terminals 118 is a set of 7-way terminals and the second set of terminals 120 is a set of 8-way terminals, connector 100 provides a 7-way connector interface portion and an 8-way connector interface portion in the same housing. One or more of the second set of terminals 120 may be electrically coupled to one or more of the first set of terminals. Electrical coupling between the first and second sets of terminals 118, 120 may be made in any suitable manner, e.g., using spring fingers or through interface electronics provided in the housing 122, as described for example in U.S. Pat. No. 7,967,617 the entire disclosure of which is hereby incorporated herein by reference.

The connector 100 may be coupled to a mounting surface (e.g., a vehicle) in any suitable manner, such as via mounting clips 124. The first cover 102 and second cover 110 may be biased in a closed position (e.g., via a spring or other suitable mechanism) to normally prevent access to (i.e., cover) the first and second sets of terminals 118, 120, respectively, and/or to protect the terminals 118, 120 from water and debris. A towed apparatus (e.g., a trailer) having a suitable connector (in this case, an 8-way connector or a 7-way connector) may be coupled to a vehicle wiring harness via connector 100, e.g., by electrically connecting the contacts of the towed apparatus connector to the corresponding contacts (e.g., contacts 118 or 120) of connector 100. This may be accomplished, for example, by moving (lifting) one of the covers 102, 110 into an open position to provide access to the corresponding terminals 118, 120 and then mating the towed connector with the correct set of corresponding terminals.

The first and second covers 102, 110 may be coupled to housing 122 in any suitable manner. In the illustrated embodiment, the first and second covers 102, 110 are hingedly coupled to the housing 122 via hinge pins 108, 114, respectively. Torsion springs may be provided around on or both of the hinge pins 108, 114, and may be configured to bias the first and second covers 102, 110 in a closed position, respectively, while allowing the covers 102, 110 to open for use.

Figure 5:
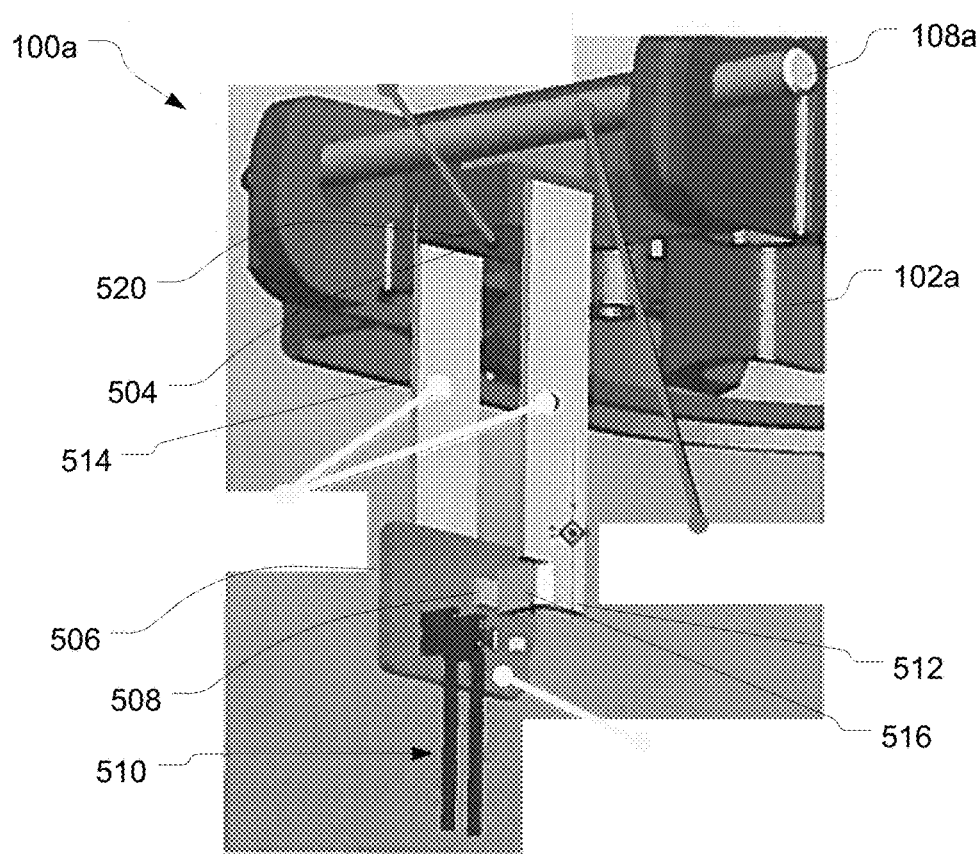
FIG. 5 is a perspective view of a portion of a connector consistent with the present disclosure.
Figure 6:
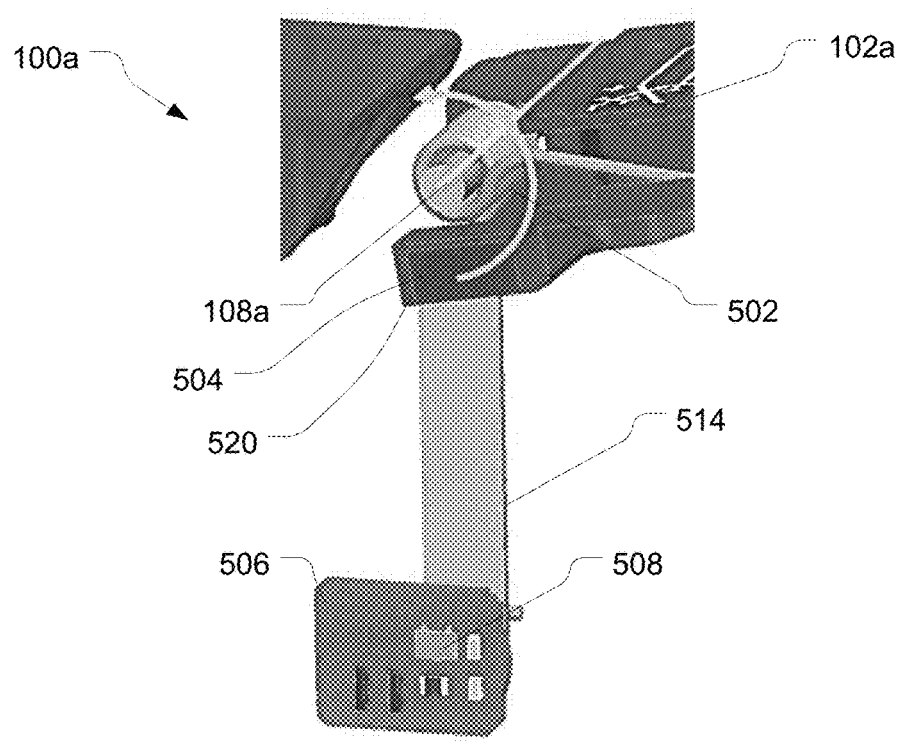
FIG. 6 is a detail perspective view of a portion of the connector shown in FIG. 5.

FIGS. 5-6 illustrate portions of a connector 100a consistent with the present disclosure. For the sake of example, elements of FIGS. 5 and 6 are described in the context of a combined trailer tow connector (e.g., a combined 7-8 way connector), but the elements of FIGS. 5 and 6 may be used in any suitable connector. As shown in FIGS. 5 and 6, connector 100a includes a first cover 102a, a hinge pin 108a, a torsion spring 502 for biasing the cover 102a in a closed position, a permanent magnet 504, a printed circuit board (PCB) 506 including a magnetic field sensor 508, terminals 510, and first 512 and second 514 pole pieces. In some embodiments the terminals 510 are configured to couple the magnetic field sensor to a cover position detector (e.g., via a wiring harness), such as a vehicle bus and/or a processor coupled to a vehicle bus. Alternatively, or additionally, terminals 510 could be omitted and magnetic field sensor may be configured to wirelessly couple with a cover position detection sensor, e.g., via a known or future developed wireless communication connection/protocol (e.g., via a cellular, WIFI, BLUETOOTH®, ZIGBEE®, near field communication (NFC), etc. communication connection/protocol).

In the embodiment of FIGS. 5 and 6 the magnet 504 is disposed in a cavity 520 formed in the first cover 102a, such that at least a portion of the magnet 504 is positioned between the first and second pole pieces 512, 514. As cover 102a rotates about the hinge pin 108a, the magnet 504 may also rotate about the hinge pin 108a, e.g., as shown by the arrow in FIG. 6. Those of ordinary skill in the art will recognize, however, that the magnet 504 may be coupled directly or indirectly to the cover 102a other ways and may be positioned to rotate about the hinge pin 108a or to move in correspondence with the cover 102a in a non-rotational manner, e.g., by indirectly coupling the magnet to the cover 102a and/or by trapping the magnet 504 for movement in a path determined by a slot. In some embodiments, at least a portion of magnet 504 remains between the first and second poles 512, 514 when the cover is in the first (e.g., open) position, when the cover is in the (second, e.g., closed) position, when the cover is in an intermediate position (e.g., between the open and closed positions), and/or when the cover is in the closed, open, and/or intermediate positions.

The magnetic field sensor 508 may be any sensor that is configured to provide an output or changing state in response to an applied magnetic field. Non-limiting examples of suitable magnetic field sensors that may be used as magnetic field sensor 508 include Hall effect sensors and reed switches, but other types of magnetic field sensors may also be used. Preferably, the magnetic field sensor 508 is a Hall effect sensor, such as a digital Hall effect sensor, an analog Hall effect sensor such as a linear Hall effect sensor, or a combination thereof.

In general, the magnetic field sensor 508 is configured to provide a first output (e.g., to terminals 508) when the cover 102a is in a first position, and to provide (e.g., to the terminals 508) a second output that differs from the first output when the cover 102a is in a second position. In some embodiments the magnetic field sensor is a digital Hall effect sensor, the first output indicates that the cover 102a is in a closed position, and the second output indicates that the cover 102a is in an open position. In some instances, the second output may also indicate that a trailer connector is attached to connector 100a. For example, in some embodiments wherein the magnetic field sensor 508 is a digital Hall effect sensor, the first output may be a digital "1" output and the second output may be a digital "0" output, or vice-versa.

In other embodiments magnetic field sensor 508 is an analog Hall effect sensor that can provide a variable output depending on the position of the magnet 504. In such instances, the devices, systems, and methods described herein may be enable detection of the absolute position of the cover 102a, e.g., relative to a fully open or a fully closed position. For example, in such instances the first position may be an open position or a closed position, and the second position may be an intermediate position between the open and closed positions. In such instances, the magnetic field sensor 508 may provide a first output when the cover is in the first position (i.e., the open or closed position), a second output when the cover is in the second (i.e., intermediate) position, and the absolute position of the cover 102a relative to the first position may determined based on the first output, the second output, or a combination thereof. In embodiments, the absolute position of the cover 102a is determined based on the second output (e.g., alone), or on a difference between the second output and the first output. Thus, in such embodiments, the magnetic field sensor enables detection of the absolute position of the cover 102(A) (e.g., along a swing path around an axis), relative to an open position, a closed position, or both.

In some embodiments the terminals 510 are coupled to a cover position sensor, thereby forming a system for detecting the position of a cover of an electrical connector. In some instances, the cover position sensor is or includes a vehicle bus coupled to the terminals 510, and a processor coupled to the vehicle bus. The vehicle bus may convey the output from magnetic field sensor 508 to the processor. The processor may determine that the cover 102a is in a closed or open position based on the received output, as previously described.

The first and second pole pieces 512, 514 are configured to direct a magnetic field/flux from the magnet 504 to the magnetic field sensor 508. In some embodiments, the first and second pole pieces 512, 514 are made from or include a ferromagnetic material, and each have a first end positioned proximate to (e.g., adjacent) the magnet 504 and a second end positioned proximate to (e.g., adjacent) the magnetic field sensor 506 for directing magnetic flux from magnet 504 to the magnetic field sensor 506. That configuration allows the magnetic field sensor 506 to be positioned away from the cover 102a, while still allowing it to sense when the cover 102a is in the closed position and the open position.

For example, when cover 102a is in the first (e.g., closed) position, the magnetic flux/field of magnet 504 may be conveyed by first and second pole pieces 512, 514 to magnetic field sensor 508. When the magnetic field sensor is a digital sensor (e.g., a digital Hall effect sensor), the magnetic field/flux detected by the magnetic field sensor 508 may exceed a threshold level and cause the magnetic field sensor to provide the first output. When the cover 102a is in the second (e.g., open) position, however, the magnetic field/flux detected by the magnetic field sensor 508 may fall below the threshold level, causing the magnetic field sensor 508 to provide the second output.

When magnetic field sensor 508 is an analog sensor such as an analog Hall effect sensor, it may provide an output that varies in a predetermined fashion based on the position of the lid 102a or, more specifically, the magnet 504. In such instances, the output provided by magnetic field sensor 508 will not depend on whether a threshold magnetic flux is greater than a threshold level, or not. Rather, the output of the magnetic field sensor 508 will vary in concert with movement of the lid 102(a) (or, more specifically, magnet 504), enabling the absolute position of the lid 102(a) (or, more specifically, magnet 504) to be determined.

In any case, use of the magnetic pole pieces 512, 514 allows magnetic field sensor 508 to be positioned away from the cover 102a. Positioning the magnetic field sensor 508 in the manner can protect it from damage and may also facilitate manufacturing of electrical connector 100 and component 100a. In non-limiting embodiments, the magnetic field sensor 508 is a Hall effect sensor and is positioned greater than or equal to 20 millimeters (e.g., about 25 mm, about 30 mm, about 35 mm, about 40 mm, about 50 mm, or more) away from the magnet 504.

In the embodiments of FIGS. 5 and 6, the magnet 504 is disposed in a cavity 520 in the cover 102a, and the ends of the pole pieces 512, 514 are disposed in a fixed position relative to the cover 102a and adjacent the sides of the cavity 520. In that configuration, when the cover 102a is moved between first (e.g., closed) and second (e.g., open) positions the cavity 520 and magnet 504 move (e.g., swing) between the pole pieces. Movement of the cavity 520 and magnet 504 can clean debris from the pole pieces and change the magnetic field/flux detected by the magnetic field sensor 506.

In the embodiment of FIGS. 5 and 6 the first and second pole pieces 512, 514 have a generally rectangular shape, though pole pieces with any suitable shape may be used. In some embodiments and as shown in FIGS. 5 and 6, one of or both the first and second pole pieces 512, 514 may also include an inwardly directed arm 516 at a corresponding end thereof. When used, each arm 516 includes at least one end surface that is positioned near the magnetic field sensor 508. Like pole pieces 512, 514, each arm 516 is configured to direct the magnetic field/flux from the magnet 504 to/through the magnetic field sensor 508. Accordingly, the arms 516 in some embodiments are formed from a ferromagnetic material. For example, in some embodiments the pole pieces 512, 514 are each formed from or include a first ferromagnetic material and arms 516 are each formed from or include a second ferromagnetic material, wherein the first ferromagnetic material is the same as or different from the second ferromagnetic material. Non-limiting examples of suitable ferromagnetic materials that may be used as or in pole pieces 512, 514 and/or arms 516 include ferromagnetic metals such as cobalt, iron, nickel, gadolinium, dysprosium, combinations thereof, and the like, and ferromagnetic alloys such as ferromagnetic iron nickel alloys, and ferromagnetic minerals such as magnetite.

Figure 7:
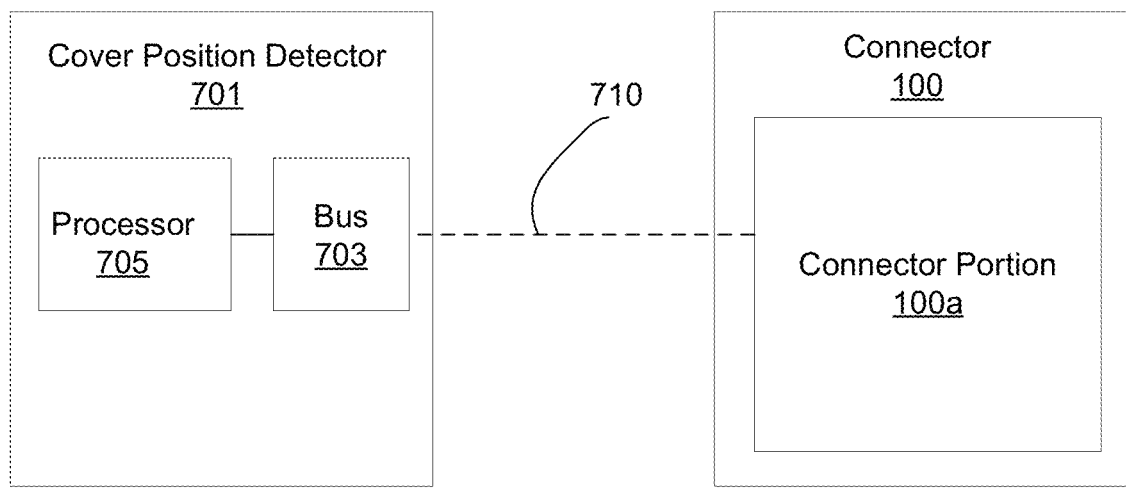
FIG. 7 is a block diagram of one example of a system for detecting the position of a cover of a connector, consistent with the present disclosure.

FIG. 7 is a block diagram depicting one example of a system 700 for detecting the position of a cover of an electrical connector, consistent with the present disclosure. System 700 includes connector 100 and connector portion 100a, the nature, configuration, and operation of which are described above and are therefore not reiterated in detail. System 700 further includes cover position detector 701. Cover position detector 701 is coupled to connector 100, e.g., via wired or wireless communication channel 710. In some embodiments channel 710 is a wired communications channel provided by terminals 510 coupled to magnetic field sensor 508, as previously described.

The cover position detector 701 may be configured in any suitable manner, provided it can detect whether a cover of connector 100 is in a first or a second position based on an output provided by a magnetic field sensor 508. In some embodiments cover position detector 701 includes a vehicle bus 703 and a processor 705. In such embodiments the vehicle bus 703 may be coupled to connector portion 100a (e.g., magnetic field sensor 508) via wired or wireless communication channel 710, and processor 705 is coupled to vehicle bus 703. In operation, a magnetic field sensor 508 of connector portion 100a may transmit an output signal indicative of the position of cover of connector 100 to vehicle bus 703 via channel 710. The vehicle bus 703 may convey the output signal to processor 705.

The processor 705 may determine whether the cover is in a first or a second position based on the output signal. In that regard, processor 705 may be any suitable general-purpose processor and/or application specific circuit. In some embodiments processor 705 may be a standalone processor, or may be an embedded processor, e.g., that forms all or part of a vehicle controller/control system. In any case, the processor 705 may cause an indicator to be presented to a user (e.g., on a user interface such as a display, instrument panel, etc.), wherein the indicator signifies to a user the detected position of the cover.

Figure 8:
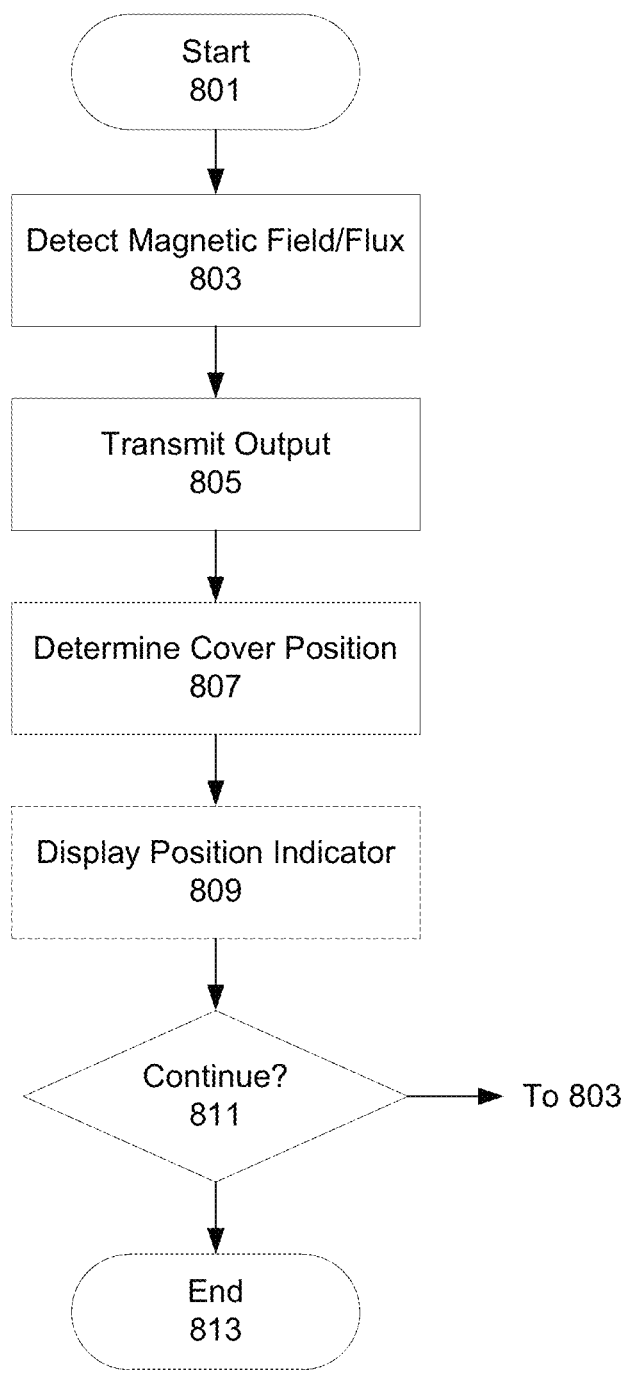
FIG. 8 is a flow diagram of example operations of one example of a method of detecting a position of a cover of a connector, consistent with the present disclosure.

FIG. 8 is a flow diagram depicting example operations of one example of a method of detecting a position of a cover of a connector that includes a housing, a cover coupled to the housing, a magnet coupled to the cover, and a magnetic field sensor. As shown, method 800 begins at block 801. The method may then proceed to block 803, pursuant to which a magnetic field/flux of the magnet may be detected with the magnetic field sensor, as discussed above. The method may then proceed to block 805, pursuant to which the magnetic field sensor may transmit a first output signal to a cover position detector when the cover is in a first position, and a second output signal to the cover position detector when the cover is in a second position, wherein the second output signal differs from the first output signal. The method may then proceed to block 807, pursuant to which the position of the cover may be determined, e.g., by the cover position detector. For example, the cover position detector may determine that the cover is in a first position in response to receipt of the first output signal, or in a second position in response to receipt of the second output signal. The method may then proceed to optional block 809, pursuant to which an optional indicator may be provided (e.g., on a display, instrument panel, or the like), wherein the indicator signifies the detected position of the cover. The method may then proceed to block 811, pursuant to which a decision may be made as to whether the method is to continue. If so, the method may loop back to block 803. If not, the method may proceed to block 813 and end.

Advantageously, therefore, there is provided a device, system and method for detecting the position of a trailer tow connector, and to indicate whether a towed vehicle connector is coupled to the trailer tow connector. As discussed above, a connector consistent with the present disclosure may include a magnet coupled to the connector housing and/or cover, and a magnetic field sensor for detecting the field established by the magnet when the cover is in a first position and a second position. The connector may further include pole pieces to direct the magnetic flux/field from the magnet to the sensor, which can facilitate manufacturability while also protecting the sensor from water and debris. The magnet may be configured to move (e.g., swing) between the pole pieces to clean debris therefrom as the cover is moved between open and closed positions.

According to one aspect of the present disclosure there is provided a trailer tow connector including: at least one set of terminals for coupling to corresponding terminals of a trailer connector; a cover having a closed position for covering the terminals and an open position for providing access to the terminals for connecting corresponding terminals of the trailer connector thereto; a magnet coupled to the cover; and a magnetic field sensor, the magnetic field sensor being configured to provide a first output when the cover is in a first position and a second output different from the first output when the cover is in a second position.

According to another aspect of the present disclosure there is provided a trailer tow connector including at least one set of terminals for coupling to corresponding terminals of a trailer connector; a cover having a closed position for covering the terminals and an open position for providing access to the terminals for connecting corresponding terminals of the trailer connector thereto; a magnet coupled to the cover; a magnetic field sensor, the magnetic field sensor being configured to provide a first output when the cover is in a first position and a second output different from the first output when the cover is in a second position; and first and second ferromagnetic pole pieces, each of the first and second pole pieces having a first end positioned adjacent the magnet and a second end positioned adjacent the magnetic field sensor to direct magnetic flux from the magnet to the magnetic field sensor. The magnet is configured to swing between the pole pieces with movement of the cover between the open and closed positions.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed.

The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one."

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein regarding mechanical or physical connections or couplings is a relative term and does not require a direct physical connection.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary. The terms "first," "second," and the like herein do not denote any order, quantity, or importance, but rather are used to distinguish one element from another, and the terms "a" and "an" herein do not denote a limitation of quantity, but rather denote the presence of at least one of the referenced item.

What is claimed:

1. A trailer tow connector comprising:
   a housing;
   a set of terminals for coupling to corresponding terminals of the trailer connector;
   a cover, wherein the cover is hingedly coupled to the housing such that the cover is movable between a first position and a second position, wherein the first position is a closed position in which the set of terminals is covered and the second position is an open position in which the set of terminals is accessible for connecting to the corresponding terminals of the trailer connector;
   a magnet; and
   a magnetic field sensor configured to detect the magnet and generate a first output when the cover is in the first position and a second output when the cover is in the second position, wherein the second output differs from the first output.

2. The trailer tow connector of claim 1, further comprising first and second ferromagnetic pole pieces to direct magnetic flux from the magnet to the magnetic field sensor.

3. The trailer tow connector of claim 2, wherein each of the first and second pole pieces comprise a first end that is positioned adjacent the magnet and a second end that is positioned adjacent the magnetic field sensor.

4. The trailer tow connector of claim 2, wherein the magnet moves between the first and second pole pieces when the cover moves between the first position and the second position.

5. The trailer tow connector of claim 2, wherein each of the first and second pole pieces comprise an inwardly directed arm, the inwardly directed arm comprising an end surface that is positioned adjacent the magnetic field sensor.

6. The trailer tow connector of claim 1, wherein the magnetic field sensor is a Hall effect sensor.

7. The trailer tow connector of claim 1, wherein the magnet moves as the cover is moved between the first position and the second position.

8. The trailer tow connector of claim 1, wherein:
   the cover comprises a cavity for said magnet;
   the magnet is at least partially disposed within the cavity.

9. A system for detecting a position of a cover of the trailer tow connector, comprising:
   a trailer tow connector coupled to the cover position detector, the trailer tow connector comprising:
   a housing;
   a first set of terminals for coupling to corresponding terminals of a trailer connector;
   a cover, wherein the cover is hingedly coupled to the housing such that the cover is movable between a first position and a second position, wherein the first position is a closed position in which the set of terminals is covered and the second position is an open position in which the set of terminals is accessible for connecting to the corresponding terminals of the trailer connector; and
   a position sensor system configured to determine a position of said cover.

10. The system of claim 9, wherein the position sensor system further comprises:
    a magnet;
    a magnetic field sensor configured to detect the magnet and generate a first output when the cover is in the first position and a second output when the cover is in the second position, wherein the second output differs from the first output.

11. The system of claim 10, wherein when the cover moves between the first position and the second position, the magnet moves between the first and second ferromagnetic pole pieces.

12. The system of claim 10, wherein the magnetic field sensor is a Hall effect sensor.

13. The system of claim 9, further comprising a cover position detector configured to determine a position of the cover based on an output of the position sensor system.

14. The system of claim 10, wherein:
    the cover comprises a cavity for said magnet;
    said magnet is at least partially disposed within said cavity, such that at least a portion of said magnet is positioned between first and second ferromagnetic pole pieces and proximate a first end of said first and second ferromagnetic pole pieces.

15. A method for detecting the 1N position of a cover of a trailer tow connector, wherein the trailer tow connector comprises a housing, a cover hingedly coupled to the housing, a first set of terminals for coupling to corresponding terminals of the trailer connector, and a position sensor system, the method comprising:
    in response to the cover hingedly moving to a first position, transmitting a first output from the position sensor system to a cover position detector, wherein the first position is a closed position in which the set of terminals is covered; and
    in response to the cover hingedly moving to a second position, transmitting a second output from the position sensor system to said cover position detector, the second output being different from the first output, wherein the second position is an open position in which the set of terminals is accessible for connecting to the corresponding terminals of the trailer connector; and determining, with the cover position detector, a position of said cover based on the first output, the second output, or a combination thereof.

16. The method of claim 15, wherein the position sensor system comprises a magnet and a magnetic field sensor configured to detect the magnet.

* * * * *